(12) United States Patent
Hawkins et al.

(10) Patent No.: US 9,671,043 B2
(45) Date of Patent: Jun. 6, 2017

(54) SYSTEMS AND METHODS FOR RETRIEVING A BURIED SUBSEA TUBULAR

(71) Applicants: Paul D Hawkins, Lafayette, LA (US); Carbert W Navarre, II, Lafayette, LA (US)

(72) Inventors: Paul D Hawkins, Lafayette, LA (US); Carbert W Navarre, II, Lafayette, LA (US)

(*) Notice: Subject to any disclaimer, the term of this patent is extended or adjusted under 35 U.S.C. 154(b) by 623 days.

(21) Appl. No.: 13/987,579

(22) Filed: Aug. 9, 2013

(65) Prior Publication Data
US 2015/0043975 A1    Feb. 12, 2015

(51) Int. Cl.
*F16L 1/16*    (2006.01)
*F16L 1/20*    (2006.01)
*B63B 35/03*    (2006.01)

(52) U.S. Cl.
CPC ............. *F16L 1/166* (2013.01); *F16L 1/207* (2013.01); *B63B 35/03* (2013.01)

(58) Field of Classification Search
CPC ..... F16L 1/235; F16L 1/12; F16L 1/18; F16L 1/202; F16L 1/166; F16L 1/161; F16L 1/165; B63B 35/03; B63B 21/66; B63B 21/26; E21B 17/015; E21B 17/01; E21B 19/22; H02G 1/10; H02G 9/02; H02G 15/14
USPC .... 405/158, 164, 172, 173, 166, 169, 168.2, 405/168.1, 170
See application file for complete search history.

(56) References Cited

U.S. PATENT DOCUMENTS

| | | | |
|---|---|---|---|
| 1,957,622 A | 5/1934 | Visnyei | |
| 2,355,086 A | 8/1944 | Lang | |
| 2,389,286 A * | 11/1945 | Watkins | B25H 7/005 266/56 |
| 2,738,488 A * | 3/1956 | MacKnight | G01V 1/201 174/106 R |
| 2,739,828 A * | 3/1956 | Schindler | F16L 23/12 285/148.12 |
| 2,934,033 A | 4/1960 | Dent et al. | |
| 3,390,532 A * | 7/1968 | Lawrence | B63B 35/03 226/108 |
| 3,520,358 A * | 7/1970 | Brooks | E21B 33/076 166/356 |
| 3,641,780 A * | 2/1972 | Ede | E02F 5/102 37/370 |
| 3,685,306 A * | 8/1972 | Mott | F16L 1/203 226/24 |
| 3,751,927 A | 8/1973 | Perot | |
| 3,751,932 A * | 8/1973 | Matthews, Jr. | F16L 1/166 137/15.07 |

(Continued)

*Primary Examiner* — Benjamin Fiorello
*Assistant Examiner* — Edwin Toledo-Duran

(57) ABSTRACT

Systems and methods for unearthing, retrieving, and processing subsea tubulars can include engaging a cable to an end of a subsea tubular and a vessel, moving the vessel in a direction parallel to the axis of the tubular, and unearthing the tubular using the thrust of the vessel. Unearthed tubulars can be dragged to a remote location, retrieved to the surface for transport or processing. On-site processing can be performed using a tensioning device to continuously move a tubular into association with a cutting device, which severs a first portion of the tubular while a second portion remains engaged with the tensioning device.

19 Claims, 4 Drawing Sheets

(56) References Cited

U.S. PATENT DOCUMENTS

| | | | |
|---|---|---|---|
| 3,777,499 A * | 12/1973 | Matthews, Jr. | F16L 1/166 114/50 |
| 3,795,115 A * | 3/1974 | Bergquist | E21B 41/06 166/338 |
| 3,842,612 A | 10/1974 | Arnold | |
| 4,011,729 A | 3/1977 | Kermel | |
| 4,041,719 A * | 8/1977 | Baugh | B63C 11/40 405/169 |
| 4,063,430 A | 12/1977 | Lamy | |
| 4,106,335 A | 8/1978 | Shatto | |
| 4,107,933 A | 8/1978 | Lamy | |
| 4,135,844 A | 1/1979 | Lamy | |
| 4,150,503 A | 4/1979 | Lespinasse | |
| 4,234,268 A | 11/1980 | Scodino | |
| 4,257,719 A | 3/1981 | Hunt et al. | |
| 4,332,510 A | 6/1982 | Ferrentino | |
| 4,445,804 A | 5/1984 | Abdallah et al. | |
| 4,448,568 A * | 5/1984 | Gentry | B63B 22/021 166/345 |
| 4,474,507 A | 10/1984 | Morton | |
| 4,545,139 A * | 10/1985 | Langner | E02F 5/104 37/195 |
| 4,574,241 A | 3/1986 | Stelly | |
| 4,906,137 A * | 3/1990 | Maloberti | E21B 17/015 166/338 |
| 4,995,168 A | 2/1991 | Shiner | |
| 5,044,827 A | 9/1991 | Gray et al. | |
| 5,269,629 A * | 12/1993 | Langner | F16L 27/103 166/367 |
| 5,421,674 A * | 6/1995 | Maloberti | F16L 11/083 405/166 |
| 5,437,517 A * | 8/1995 | Carrioli | F16L 55/1608 405/169 |
| 5,501,549 A * | 3/1996 | Breda | E21B 43/0135 166/338 |
| 5,615,977 A * | 4/1997 | Moses | E21B 17/015 166/350 |
| 5,639,187 A * | 6/1997 | Mungall | E21B 17/015 166/350 |
| 5,687,793 A * | 11/1997 | Reimert | E21B 19/002 166/342 |
| 5,919,003 A | 7/1999 | Pregeant et al. | |
| 5,921,713 A * | 7/1999 | Gjessing | E21B 41/04 405/158 |
| 5,944,448 A * | 8/1999 | Williams | B63B 21/50 114/230.2 |
| 6,004,071 A * | 12/1999 | Broeder | F16L 1/202 405/166 |
| 6,234,717 B1 * | 5/2001 | Corbetta | E21B 41/04 405/158 |
| 6,352,388 B1 * | 3/2002 | Seguin | B63B 35/03 405/166 |
| 6,361,250 B1 * | 3/2002 | de Varax | F16L 1/19 405/158 |
| 6,524,030 B1 * | 2/2003 | Giovannini | B63B 35/03 405/166 |
| 6,729,802 B2 | 5/2004 | Giovannini et al. | |
| 6,739,804 B1 * | 5/2004 | Haun | E21B 17/015 166/355 |
| 6,767,165 B1 * | 7/2004 | Corbetta | E21B 41/04 405/158 |
| 6,869,253 B2 * | 3/2005 | Biolley | E21B 17/015 166/345 |
| 6,904,856 B2 | 6/2005 | Wallace | |
| 7,182,550 B2 * | 2/2007 | Renkema | F16L 1/18 405/158 |
| 7,507,055 B2 | 3/2009 | Smith et al. | |
| 7,621,697 B2 | 11/2009 | Steenhuis et al. | |
| 7,628,568 B2 * | 12/2009 | Critsinelis | E21B 17/01 405/169 |
| 7,993,077 B2 | 8/2011 | Alliot | |
| 8,007,203 B2 * | 8/2011 | Espinasse | E21B 17/015 405/169 |
| 8,696,245 B2 * | 4/2014 | Clark, II | B63B 35/03 405/156 |
| 8,827,595 B2 * | 9/2014 | Brocklebank | F16L 1/19 405/166 |
| 2005/0063785 A1 * | 3/2005 | Hart | E02F 5/003 405/164 |
| 2006/0115331 A1 | 6/2006 | Matteucci | |
| 2007/0177944 A1 * | 8/2007 | Smith | F16L 1/202 405/169 |
| 2008/0253842 A1 * | 10/2008 | Wolbers | B63B 27/24 405/169 |
| 2008/0309077 A1 * | 12/2008 | Espinasse | E21B 17/015 285/259 |
| 2009/0324339 A1 * | 12/2009 | Roodenburg | F16L 1/19 405/166 |

\* cited by examiner

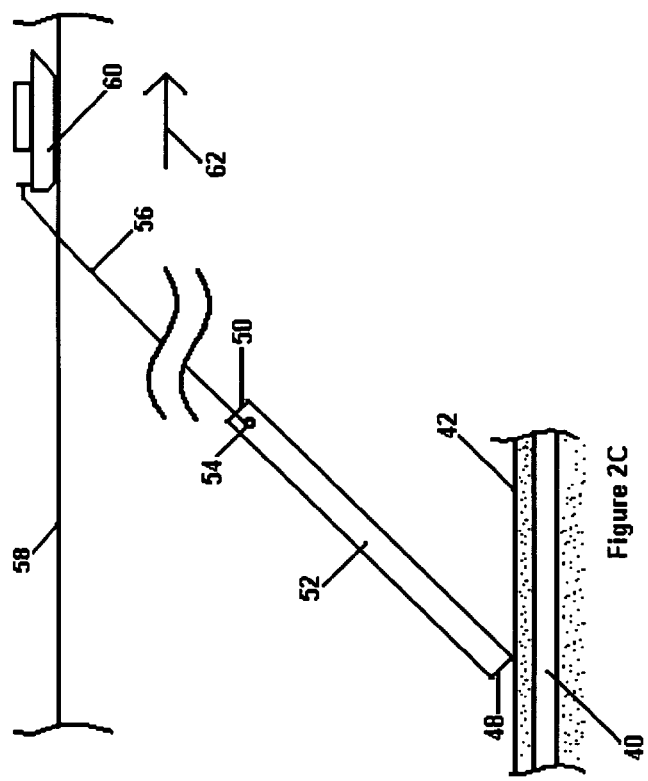
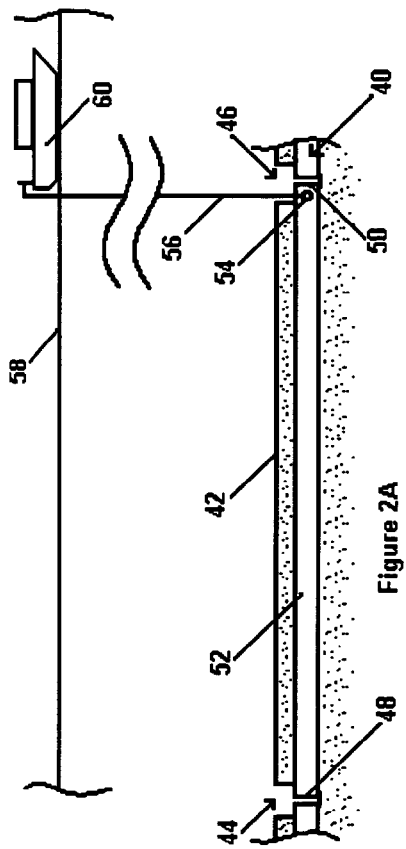
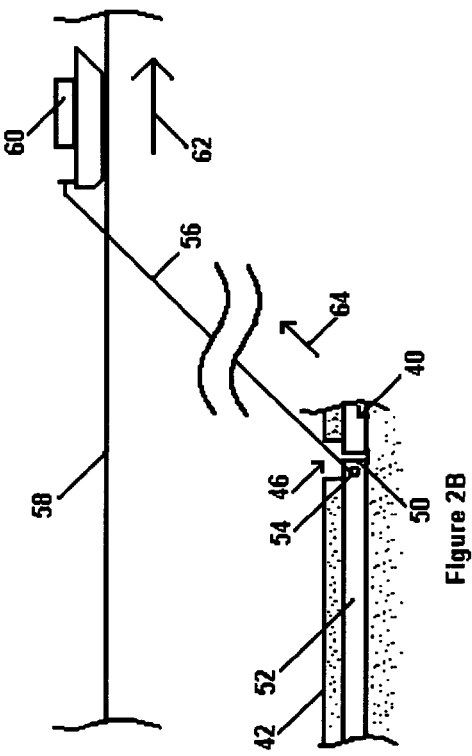

SYSTEMS AND METHODS FOR RETRIEVING A BURIED SUBSEA TUBULAR

FIELD

Embodiments usable within the scope of the present disclosure relate, generally, to systems and methods for unearthing a buried subsea tubular, and more specifically, to vessels and processes usable to unearth, retrieve, move, and/or process segments of subsea pipelines or other similar objects.

BACKGROUND

When transporting hydrocarbons or similar liquid or gaseous substances from one location to another, across a body of water, use of a subsea pipeline is often preferable to the transport of hydrocarbons by using ships or aircraft, especially when a frequent or continuous need exists to transport such substances. As a result, the sea floor contains numerous pipelines, especially in regions of the world having a large number of hydrocarbon production and refining facilities. Many subsea pipelines rest on the seabed, though to protect pipelines from damage, it is preferred to bury pipelines underneath the sea floor.

Previously, when use of a subsea pipeline is no longer desired, due to damage or simply due to the cessation of a need to transport substances to locations along the pipeline, the pipeline would simply be left in place. Due to its placement underneath the sea floor, the presence of the abandoned pipeline did not present a significant concern unless unearthed by severe weather, tectonic activity, or other conditions. However, recent regulations have begun to incentivize, if not require, the removal of buried subsea pipelines when no longer in use.

While an abundance of equipment exists to facilitate the proper placement of subsea pipe segments for use, without damaging the pipeline or coating, very little specialized equipment exists for the removal of buried subsea tubulars. Because recovered segments of subsea pipelines are primarily only useful as salvage/scrap metal, the propensity of damaging, deforming, or otherwise modifying the tubulars to be recovered is not a concern, and various methods for retrieving pipe segments from the sea floor have been cobbled together using equipment not specifically intended for such a purpose.

For example, a conventional method for retrieving a segment of subsea pipeline involves manually digging an excavation area at each end of the segment (e.g., by divers, ROVs, or similar manual means), severing the pipe segment at each end, then attaching one end of the pipe segment to a cable, either directly (e.g., by cutting a hole in the sidewall of the pipe and securing the cable), or by using a connector designed to engage the interior or exterior of the severed end. The unsecured end of the cable is then allowed to float to the surface, assisted by a buoy, float, or similar attachment. A tugboat or similar vessel is then used to transport the floating end of the cable to an offshore platform or ship—normally a lift barge having a winch or a similar type of pulling device thereon, which is used to pull the cable and retrieve the tubular to the vessel. The lift barge must be positioned a significant distance away from the severed end of the tubular to facilitate pulling in a curved, "J" shaped path; pulling on a buried pipe segment, using a force with too great of a vertical component, can cause the lift barge to sway or topple due to the counter-force applied by the buried tubular. It should be noted that lift barges and similar vessels are not specifically designed or intended for such a purpose, and are subject to possible damage, falling, and similar hazards.

Once a tubular segment has been hoisted to the surface, it can be stored on the deck of the lift barge for subsequent transport (e.g., via movement of the lift barge or by unloading the tubular to an adjacent vessel) to a processing facility; however, the transport of a number of tubular segments from the deck of a lift barge to an adjacent vessel requires the time-consuming manual lifting and manipulation of each segment using a crane or similar device, which can create a potentially dangerous environment for personnel required to engage and disengage tubular members from the crane. Some vessels include processing equipment (e.g., cutters) positioned thereon, such that a retrieved tubular segment can be cut on-site to facilitate storage and transport; however, after processing a first tubular segment, manual intervention by personnel is normally necessary to engage and retrieve a subsequent tubular segment to the deck of the vessel. Additionally, the cutting and processing of tubulars on a vessel can be hindered or rendered impossible during unfavorable weather conditions.

A need exists for efficient systems and methods of unearthing, transporting, and/or processing subsea pipelines and similar tubular members that minimize the amount of manual intervention required by personnel, e.g., to engage and disengage cables from pipe segments and equipment.

A need also exists for systems and methods that enable safer unearthing, transporting, and/or processing operations for subsea pipelines than conventional alternatives.

A further need exists for systems and methods that can enable generally continuous movement and on-site processing of subsea pipelines during circumstances when transport of pipe segments may not be desirable.

Embodiments usable within the scope of the present disclosure meet these needs.

SUMMARY

Embodiments usable within the scope of the present disclosure include systems and methods for retrieving a segment of a subsea tubular, such as a buried portion of a subsea pipeline, using a vessel. A first end of a cable is engaged with an end of a subsea tubular that is at least partially disposed beneath a subsea floor, while a second end of the cable is engaged with a vessel positioned at the surface. Movement of the vessel in a direction parallel to the axis of the subsea tubular applies an axial force thereto, via the cable, which unearths the portion of the tubular disposed beneath the subsea floor. While conventional alternatives require a first vessel to transport the second end of a cable to a lift barge, a platform, or similar remote facility to enable a winch or similar device to be used to pull the tubular, embodiments described herein can use the thrust of the vessel, itself, to unearth the tubular from beneath the subsea floor, and if desired, to drag the tubular along the subsea floor to a destination location.

For example, during inclement weather conditions, where hoisting a tubular to the surface and/or processing a tubular is not possible, embodiments of the present method can be used to unearth and drag the tubular, beneath the surface of the water, from an initial location to a desired destination on the sea floor, where the tubular can be released for storage and subsequent retrieval, e.g., when weather conditions do not hinder the retrieval process. Even in the absence of inclement weather or similar conditions, in some embodiments, it may be desirable to release one or more subsea tubulars at a destination location for subsequent retrieval by a separate vessel for processing and/or transport to a processing facility, e.g., to enable the initial vessel to continuously perform unearthing and dragging operations, uninterrupted.

In an embodiment, a subsea tubular can be retrieved to the surface for transport from the initial vessel to an adjacent vessel or facility for on-site processing. For example, certain subsea environments may prevent dragging of an unearthed tubular along the subsea floor to a destination location, e.g., due to the presence of other subsea equipment, pipelines, and/or other objects or structures that could hinder a dragging operation and/or could be undesirably damaged. The retrieved tubular can be progressively lowered and/or otherwise moved into engagement with an adjacent vessel or facility to be cut and/or otherwise processed using equipment on the adjacent vessel or facility.

Alternatively or additionally, the initial vessel can include cutting and/or processing equipment thereon for on-site processing of retrieved tubulars. For example, in an embodiment, the vessel can have a tensioning device positioned thereon, having one or more movable members (e.g., conveyor-type members) adapted to contact an exterior surface of a subsea tubular. The tensioning device can be used to apply an axial force to the tubular, which can be used to unearth a buried portion of the tubular and/or to move the tubular toward the tensioning device. A first portion of the tubular can be moved external to the tensioning device, in this manner, while a second portion remains engaged, such that a cutting device (e.g., a guillotine-type cutter or similar type of cutting device) can be used to sever the first portion of the tubular while the second portion remains engaged. Use of a tensioning device in this manner enables a subsea pipeline to be continuously engaged and/or pulled toward a vessel, without requiring the manual manipulation of cables and connectors by personnel between each cutting operation. In embodiments where the tubular is moved continuously using the tensioning device, a cutting device can be moved concurrently with the tubular (e.g., along a track, channel, or similar member) at the same rate and in the same direction, to facilitate cutting the tubular without requiring movement of the tensioning device to be stopped.

BRIEF DESCRIPTION OF THE DRAWINGS

FIGS. 2A through 2C depict a subsea tubular and vessel, performing three steps of the method illustrated in FIG. 1.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

Figure 1:
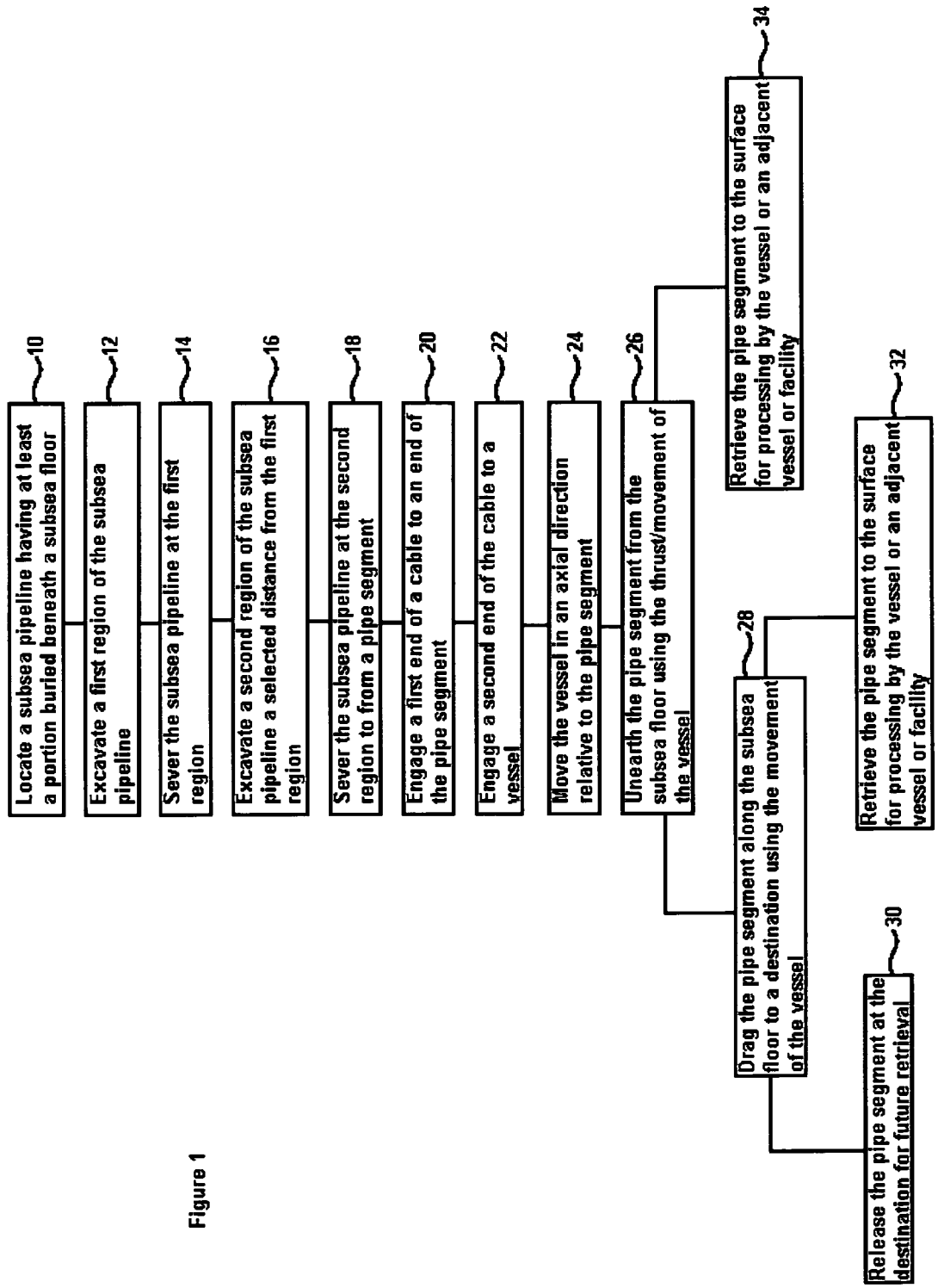
FIG. 1 depicts a diagram illustrating an embodiment of a method usable within the scope of the present disclosure.

FIG. 1 depicts a diagram illustrating an embodiment of a method for unearthing, moving, retrieving, and/or processing a portion of a subsea pipeline or similar tubular, usable within the scope of the present disclosure. While the embodied method refers, generally, to a subsea pipeline, it should be understood that embodiments of the present systems and methods can be used with any type of pipe, tubular member, or other subsea object.

Initially, a subsea pipeline, having at least a portion buried beneath the subsea floor, is located (10). Generally, the location of buried subsea pipelines is recorded at the time a pipeline is placed, and updated records of the location of buried pipelines are maintained, e.g., through use of ROVs and/or similar vessels that maneuver along the location of a pipeline using imaging and/or other types of detection equipment to confirm the location of the pipeline. As such, at the onset of the described method, the location of a buried subsea pipeline may be known without undertaking specific measures to locate the pipeline; however, various types of equipment for locating buried objects (e.g., ultrasound devices, probes, etc.) can be used, as needed, without departing from the scope of the present disclosure. For example, U.S. Pat. Nos. 4,995,168 and 4,574,241, which are incorporated by reference herein in their entirety, describe equipment and methods usable to locate buried subsea pipelines.

At a selected location along the subsea pipeline, a first region of the pipeline is excavated (12). This operation can be performed manually using divers, ROVs, and/or various types of digging and/or excavation equipment. Alternatively or additionally, equipment suitable for digging and/or excavating a portion of the pipeline can be lowered and utilized from a surface vessel. In a typical embodiment, only a limited area, having a size sufficient for cleaning, severing, and/or otherwise operating on the pipeline (e.g., an area ten feet long by ten feet wide), would be excavated, due to the fact that manual excavation operations are generally tedious and time-consuming.

Then, at the first excavated region, the subsea pipeline can be severed (14), e.g., using a saw, torch, cutter, or similar type of device. Generally, prior to a cutting operation, a subsea pipeline can be cleaned (e.g., the interior thereof can be flushed and/or the exterior can be scraped, treated, and/or otherwise prepared for cutting). Various types of cutting devices (e.g., saws, guillotine type cutters, torches, etc.) can be used. By way of example, published U.S. Patent Application 2006/0115331, U.S. Pat. No. 4,234,268, and U.S. Pat. No. 4,445,804, which are incorporated by reference herein in their entirety, describe equipment and methods usable to sever a subsea pipeline; however, it should be understood that any type of manual, mechanical, remote, surface-actuated, or other type of cutting device can be used without departing from the scope of the present disclosure.

A second region along the subsea pipeline, a selected distance from the first region, can be excavated (16), e.g., in a manner identical or similar to that which the first region was excavated. The distance between the excavated regions can be selected depending on the pulling capacity of the vessel to which a severed segment of the pipeline is to be engaged and/or other equipment that may be used to manipulate the pipeline segment (e.g., cables, cranes, winches, connectors, tensioning devices, etc.). For example, the distance between the first and second regions can be one mile, 0.5 miles, 500 feet, or any other length, limited only by the capabilities of the equipment, environmental conditions, the presence of other objects (e.g., natural or manmade) proximate to the pipeline that may limit the size of a tubular segment that can be manipulated, or other similar factors.

The subsea pipeline can be severed at the second region, e.g., in a manner identical or similar to the manner in which the first region was severed, to form a pipe segment (18). It should be understood that in various embodiments, a subsea pipeline may be of limited length, and/or one or both ends of an existing pipeline may be accessible in a manner that obviates the need to excavate any portion of the pipeline, and/or the need to sever the pipeline. For example, a pre-existing pipeline, having a length suitable for manipulation (e.g., unearthing, retrieval, transport, and/or processing), could simply be engaged with a cable and vessel, as described above and below, without requiring excavation and/or severing of the pipeline.

An end of the pipe segment can be engaged with a first end of a cable (20) or similar generally elongate and/or flexible member, which can be suitable for pulling, hoisting, lifting, and/or otherwise manipulating the pipe segment and/or transmitting a force thereto. Because the pipe segment is normally retrieved for use as scrap and/or salvage, damage to the segment is typically not a concern. In an embodiment, a hole can be cut into the sidewall of the pipe segment, and a cable can be hooked, tied, clamped, clipped, and/or otherwise secured through the hole. Various types of connectors could be used to engage the cable to the pipe segment without departing from the scope of the present disclosure. For example, U.S. Pat. Nos. 4,257,719; 6,729,802; 5,044,827; 3,751,932; 3,842,612; and 4,234,268, which are incorporated by reference herein in their entirety, describe connectors and methods usable to engage a cable to a subsea tubular.

The second end of the cable can be engaged with a vessel (22), thereby connecting the vessel to the pipe segment. In various embodiments, a cable or similar elongate member can be secured to a vessel prior to extending the cable to the pipe segment and engaging the cable thereto. In other embodiments, a cable could first be engaged with the pipe segment, then extended to the surface to engage the vessel. For example, after engaging a cable to the pipe segment, the cable could be extended to the surface using a float, a buoy, or a similar device, including devices usable to aid in subsequent detection of the cable, where the cable can remain accessible for subsequent retrieval using a vessel. It should be noted that the vessel can be positioned directly above the end of the pipe segment for engagement with the cable, though in other embodiments, the cable could be extended in a non-vertical direction for engagement with a vessel positioned in other locations relative to the pipe segment. Engagement of the cable to the vessel can be accomplished using any manner of connection, connector, and/or fastener, including without limitation, connection directly to the hull, deck, or other structure of the vessel, connection to a winch, crane, or similar hoisting/pulling device, connection to a tensioner, or any other manner of connection known in the art.

After engaging the vessel to the pipe segment, the vessel can be moved in an axial direction relative to the pipe segment (24) (e.g., a direction parallel to the axis of the subsea pipeline). Movement in this manner can extend the cable and apply a force having a partially axial/horizontal component to the buried pipe segment, using the thrust/movement of the vessel. As such, the pipe segment can be unearthed from the subsea floor using the thrust/movement of the vessel (26), thereby obviating the conventional practice of transferring the cable to a platform, lift barge, or similar piece of equipment positioned a significant distance from the end of the pipe segment and enabling a single vessel to be used to perform all operations necessary to unearth and, if desired, transport and/or process a pipe segment.

Depending upon the circumstances and/or conditions associated with an operation, FIG. 1 depicts multiple alternative processes that could be performed subsequent to unearthing a pipe segment from the subsea floor. In an embodiment, the movement of the vessel can be used to drag the pipe segment along the subsea floor to a destination (28). For example, it may be desirable to store, retrieve, and/or process a pipe segment at a location remote from the site where the segment was unearthed, e.g., using processing and/or retrieval equipment available at a remote facility or vessel. As such, the pipe segment can be released at the destination for future retrieval (30), e.g., by a vessel and/or facility equipped to engage the cable and hoist the pipe segment to the surface for storage, further transport, and/or processing. During certain circumstances, such as inclement weather, the retrieval and/or processing of subsea tubulars may be hindered, while embodiments of the present method can be performed continuously, independent of such conditions, by unearthing and storing tubulars at a destination location until conditions permit retrieval and/or processing thereof.

In an alternate embodiment, after dragging the pipe segment to a destination location, the pipe segment can be retrieved to the surface (e.g., by the vessel) for processing by the vessel and/or an adjacent vessel or facility (32). For example, when it is desired to process a pipe segment at a location remote from the site where the segment was unearthed, the vessel can be used to transport the pipe segment to a destination location prior to lifting the pipe segment to the surface, where it can be processed (e.g., cut) using equipment on the vessel, and/or using equipment on an adjacent vessel or facility.

In certain locations, such as locations having a large quantity of subsea equipment, pipelines, and/or other types of natural or manmade objects in the subsea environment, it may be impossible or undesirable to drag the pipe segment from the location where it was unearthed to a remote location. As such, the pipe segment could be retrieved to the surface (e.g., using the vessel) for on-site processing by the vessel and/or an adjacent vessel or facility (34). For example, the vessel used to unearth and retrieve the pipe segment could include cutting and/or other processing equipment thereon, and in an embodiment, can include a tensioning device usable to continuously pull and/or otherwise apply an axial force to a tubular. Alternatively or additionally, the vessel could be used to retrieve the pipe segment to the surface, then the pipe segment could be engaged with and/or gradually transferred to a processing vessel or facility and/or to equipment on an adjacent vessel or facility usable to manipulate the pipe segment (e.g., by gradually lowering the pipe segment from the vessel while the adjacent vessel or facility retrieves, processes, and/or otherwise manipulates the pipe segment).

FIGS. 2A through 2C are diagrammatic side views of a buried subsea pipeline and a vessel, which illustrate the steps of engaging a cable between a buried subsea tubular and a vessel, moving the vessel in an axial direction relative to the subsea tubular, and unearthing the subsea tubular using the thrust and/or movement of the vessel, respectively.

Specifically, FIG. 2A depicts a subsea pipeline (40) buried beneath a subsea floor (42). A first excavation region (44) and a second excavation region (46) have been created (e.g., dug) within the subsea floor (42) to provide access to two locations along the pipeline (40), spaced a selected distance apart depending on the capabilities of the vessel and/or equipment to be used to manipulate a severed portion of the pipeline (40). A cut is shown formed in the pipeline (40) at each of the excavation regions (44, 46), thereby creating a pipe segment (52) having a first end (48) and a second end (50). An orifice (54), formed in the pipe segment (52) near the second end (50), is depicted as a point of attachment for a cable (56) that extends from the pipe segment (52) to the surface (58) of the depicted body of water to engage a vessel (60). While any type of vessel can be used without departing from the scope of the present disclosure, in various embodiments, the vessel (60) could include a dynamic positioning vessel (e.g., having a system usable to accurately position the vessel while accounting for wave motion, heave of tubulars or other components and/or equipment engaged with the vessel, and/or other similar forces). It should be understood, however, that a tug boat or other generally simple types of vessels could also be used effectively.

FIG. 2B depicts the vessel (60) engaged to the pipe segment (52) of the subsea pipeline (40), via the cable (56) engaged with the orifice (54) near the second end (50) of the pipe segment (52). The vessel (60) is shown having moved in a lateral direction along the surface (58) of the body of water, in a direction parallel to the axis of the pipe segment (52), indicated by the arrow (62), such that the cable (56) is under tension (e.g., generally taut). The force applied in the direction (62) using the thrust/movement of the vessel (60) is transferred through the cable (56) to the pipe segment (52), which in turn causes an application of a force having both a vertical and horizontal component, illustrated by the arrow (64), to be applied to the second end (50) of the pipe segment (52). The force (64), generated through the thrust/movement of the vessel (60) is provided with a direction and magnitude suitable for pulling the pipe segment (52) from beneath the subsea floor (42) (e.g., unearthing the pipe segment (52)). All or a portion of the pipe segment can pass through the second excavation region (46), or alternatively or additionally, one or more portions of the subsea floor (42) can be disturbed and displaced due to movement of the pipe segment (52).

FIG. 2C depicts the vessel (60) engaged to the unearthed pipe segment (52), via the cable (56). After unearthing of the pipe segment (52), continued movement of the vessel (60) in a lateral direction, such as that indicated by the arrow (62), can be used to drag the pipe segment (52) along the subsea floor (42) to a destination location. While FIG. 2C depicts the pipe segment (52) in contact with the subsea floor (42), in various embodiments, the pipe segment (52) could be partially lifted from the subsea floor (42) (e.g., using a winch or similar equipment on the vessel (60)), or retrieved to the surface (58) for transport to the deck or other storage area of the vessel (60), for transfer to an adjacent vessel or facility, and/or for processing by the vessel (60) or an adjacent vessel or facility.

Figure 3:
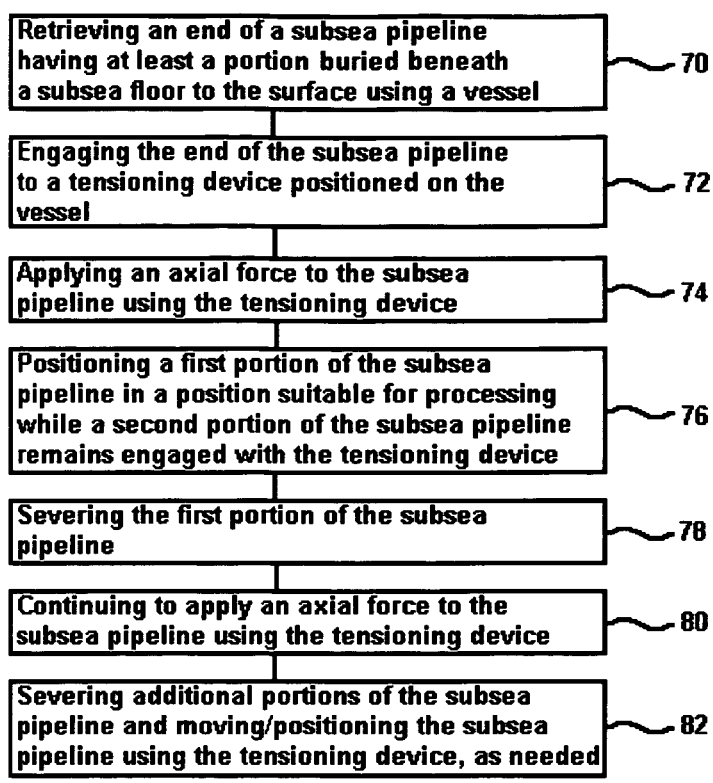
FIG. 3 depicts a diagram illustrating an embodiment of a method usable within the scope of the present disclosure.

FIG. 3 depicts a diagram illustrating an embodiment of a method for unearthing, moving, retrieving, and/or processing a portion of a subsea pipeline or similar tubular, usable within the scope of the present disclosure. While the embodied method refers, generally, to a subsea pipeline, it should be understood that embodiments of the present systems and methods can be used with any type of pipe, tubular member, or other subsea object.

An end of a subsea pipeline, having at least a portion buried beneath a subsea floor, can be retrieved to the surface using a vessel (70). Retrieval of the end of the subsea pipeline can be achieved using, for example, the methods described previously—e.g., excavating and/or severing one or multiple locations along the pipeline, engaging a cable thereto, and unearthing the pipeline using the thrust and/or movement of the vessel. Other methods for unearthing at least a portion of the pipeline and retrieving the end of the pipeline to the surface (e.g., using a winch or similar lifting equipment) can be used without departing from the scope of the present disclosure.

Once retrieved, the end of the subsea pipeline can be engaged to a tensioning device positioned on the vessel (72). Usable tensioning devices can include, by way of example, any manner of linear pipe tensioner, typically used during the process of laying pipe (e.g., using an S-lay process). By way of example, U.S. Pat. No. 4,810,132, which is incorporated by reference herein in its entirety, discloses a pipe tensioning device used for laying subsea pipe. During normal use, a pipe tensioner is used to apply a horizontal force to a pipe to ensure that the pipe is under sufficient tension when placed along the sea floor. However, embodiments usable within the scope of the present disclosure can utilize a tensioning device to apply an axial and/or pulling force to an existing subsea pipeline to thereby retrieve the pipeline toward the vessel. For example, a typical pipe tensioner includes two or four movable members (e.g., chain and or conveyor-type members), placed about an elongate cavity designed to retain a tubular member. The conveyor-type members are used to apply an axial tensioning force to the engaged tubular.

In embodiments of the present systems and methods, the movable members of tensioning device can be used to retrieve and/or otherwise move at least a portion of a subsea pipeline toward the vessel. Specifically, an axial force can be applied to the subsea pipeline using the tensioning device (74). This force can be used to unearth a buried portion of a subsea pipeline, e.g., in lieu of or in addition to use of the thrust and/or movement of the vessel. In an embodiment, the vessel can be moved in a direction concurrent with that applied by the tensioning device, e.g., to provide a combined axial force to the subsea pipeline in excess of that provided by either the tensioning device or the vessel alone. Alternatively, the vessel can be moved in a direction opposite that applied by the tensioning device, e.g., to counteract loads and/or counter-forces applied to the vessel by the pipeline. In an embodiment, a dynamic positioning system can be used to maintain the vessel in a generally constant position by compensating for forces applied to the vessel during use of the tensioning device, and/or from ambient environmental conditions.

The tensioning device can be used to position a first portion of the subsea pipeline in a position suitable for processing and/or cutting (e.g., a position external to the tensioning device), while a second portion of the pipeline remains engaged with the tensioning device (76). The first portion of the subsea pipeline can then be severed (78), while the second portion of the pipeline remains in continuous engagement with the tensioning device. A guillotine cutter and/or any other manner of cutting device can be used to sever the first portion of the pipeline. In an embodiment, the tensioning device can be used to continuously move the subsea pipeline at a controlled/known rate, and the cutting device can be provided with a range of mobility (e.g., through placement along a track or channel), such that the cutting device can be moved concurrently with the subsea pipeline to facilitate cutting/severing thereof, unhindered by the motion of the pipeline.

As such, the tensioning device can be used to apply a continuing axial force to the subsea pipeline (80), and additional portions of the pipeline can be severed (e.g., using the cutting device) and positioned for subsequent cutting operations (e.g., using the tensioning device), as needed (82).

Figure 4A:
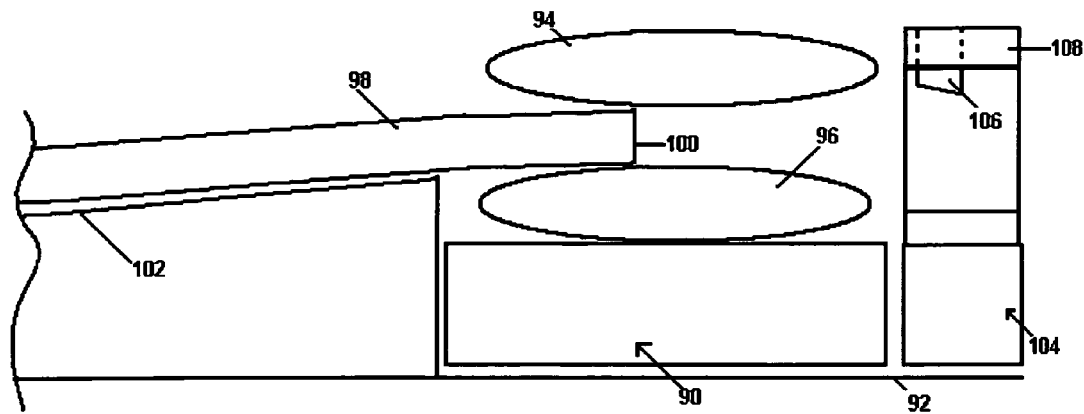
FIGS. 4A through 4C depict an embodiment of a system usable within the scope of the present disclosure, illustrating three steps of the method shown in FIG. 3.
Figure 4B:
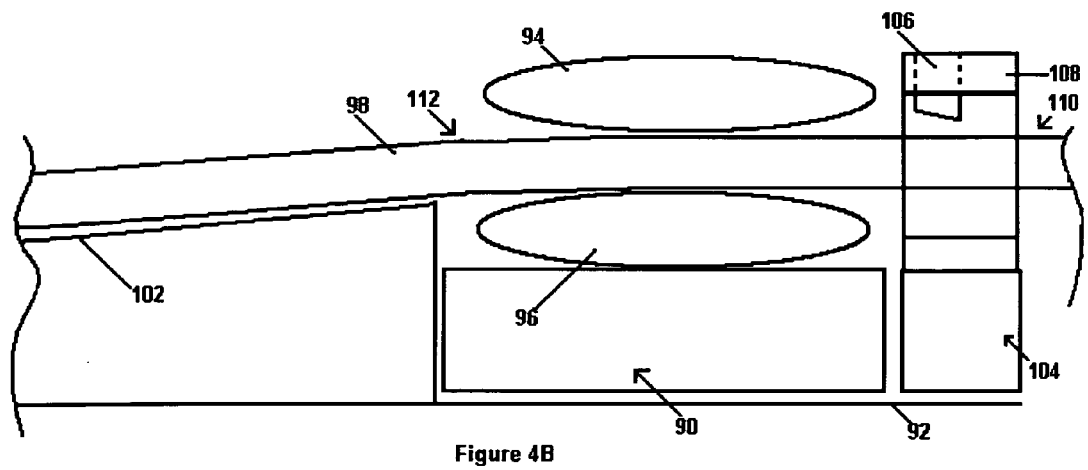
Figure 4C:
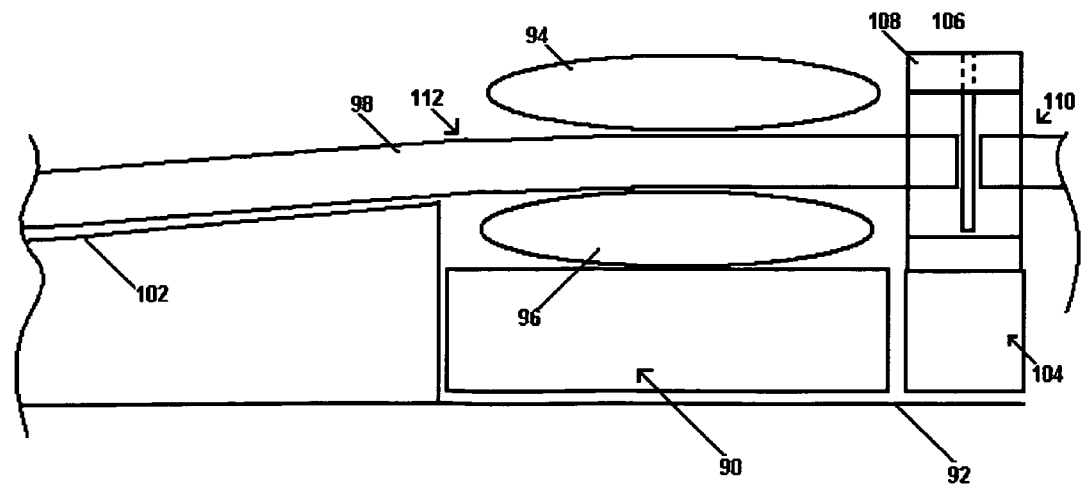

FIGS. 4A through 4C are diagrammatic side views of a system usable for moving and cutting a tubular, positioned on a vessel, which illustrate the steps of engaging an end of a subsea pipeline to a tensioning device positioned on a vessel, positioning a first portion of the subsea pipeline (e.g., using axial force applied by the tensioning device) in a position suitable for processing while a second portion of the subsea pipeline remains engaged with the tensioning device, and severing the first portion of the subsea pipeline.

FIG. 4A depicts a tensioning device (90) positioned on the deck (92) of a vessel (e.g., a dynamic positioning vessel), the tensioning device (90) having a first movable member (94) and a second movable member (96) (e.g., roller, chain, and/or conveyor-type members) adapted to contact the exterior of a tubular member and applying an axial force thereto. An end (100) of a subsea pipeline (98) is shown engaged with the movable members (94, 96). While FIG. 4A depicts a tensioning device (90) having two movable members (94, 96) (e.g., an upper member and a lower member), embodiments usable within the scope of the present disclosure could include any type of tensioning device, including devices having a single movable member or four or more movable members. A ramp (102) is shown positioned on the deck (92) for guiding the subsea pipeline (98) into engagement with the tensioning device (90). A cutting device (104) (e.g., a guillotine cutter), having a blade (106) movably mounted on a track (108), channel, rail, or similar feature, is shown adjacent to the tensioning device (90).

FIG. 4B depicts the system after the subsea pipeline (98) has been advanced through the tensioning device (90) (e.g., via movement of the movable member (94, 96)), and through the cutting device (104), defining a first portion (110) of the subsea pipeline (98) positioned at a location suitable for cutting by the cutting device (104) and a second portion (112) engaged by the tensioning device (90). It should be understood that while not depicted in FIG. 4B, any manner of ramps, rails, supports, channels, troughs, clamps, guides, etc. can be provided in association with the first portion (110) of the subsea pipeline (98) to guide and support the first portion (110).

FIG. 4C depicts the system following the severing of the first portion (110) of the subsea pipeline (90) from the remainder thereof. Specifically, the blade (106) of the cutting device (104) is shown in an alternate position along the track (108), the blade (106) being movable concurrent with the axial motion of the first portion (110) of the subsea pipeline (98), outward from the tensioning device (90). Lowering of the blade (106) can thereby sever the first portion (110) from the remainder of the pipeline (98). Movement of the blade (106) along the track (108), concurrent with the movement of the pipeline (98), enables the blade to cleanly sever the pipeline (98) without requiring clamps and/or other securing members to stabilize movement thereof, thereby enabling continuous movement of the pipeline (98) using the tensioning device (90). It should be understood, however, that embodiments can include such securing devices and/or a non-movable blade without departing from the scope of the present disclosure.

Though not specifically depicted in FIG. 4C, any manner of ramps, rails, supports, channels, troughs, clamps, guides, etc. can be provided in association with the severed first portion (110) to guide and support the first portion (110). A lifting device (e.g., a crane) or other types of device able to manipulate severed portions of the pipeline (98) can be used to transport the severed first portion (110) to another location on the vessel, or an adjacent vessel or facility. Embodiments described herein can thereby eliminate the need for personnel on the vessel to manually manipulate tubular members, attach and detach cables, and similar manual tasks normally required when moving and processing severed portions of a subsea pipeline.

While these embodiments have been described with emphasis on the embodiments, it should be understood that within the scope of the appended claims, the embodiments might be practiced other than as specifically described herein.

What is claimed is:

1. A method for retrieving a segment of a subsea tubular disposed beneath a subsea floor, the method comprising the steps of:
   partially excavating the subsea tubular such that a first region is exposed;
   severing the subsea tubular within the first region to create a first end;
   engaging a first end of a cable with the first end of the subsea tubular;
   engaging a second end of the cable with a vessel positioned at a surface of a body of water; and
   moving the vessel in a direction parallel to an axis of the subsea tubular, thereby applying an axial force to the subsea tubular via the cable using a thrust of the vessel, wherein the axial force unearths the remainder of the subsea tubular from beneath the subsea floor.

2. The method of claim 1, further comprising the step of moving the vessel to drag the subsea tubular along the subsea floor to a destination location.

3. The method of claim 2, further comprising the step of disengaging the vessel from the subsea tubular at the destination location to release the subsea tubular to the subsea floor for subsequent retrieval.

4. The method of claim 2, further comprising the step of retrieving the subsea tubular to the surface for transport from the vessel to an adjacent vessel or facility, processing by the adjacent vessel or facility, or combinations thereof.

5. The method of claim 1, further comprising the step of retrieving the subsea tubular to the surface for on-site processing by an adjacent vessel or facility.

6. The method of claim 1, further comprising the step of retrieving the subsea tubular to the surface for on-site processing by the vessel.

7. The method of claim 6, further comprising the step of engaging the first end of the subsea tubular with a tensioning device positioned on the vessel, wherein the tensioning device comprises at least one movable member adapted to contact an exterior surface of the subsea tubular.

8. The method of claim 7, further comprising the step of moving said at least one movable member to apply an axial force to the subsea tubular and pull the subsea tubular toward the tensioning device.

9. The method of claim 8, wherein the step of moving said at least one movable member to apply the axial force to the subsea tubular further comprises moving a first portion of the subsea tubular beyond the at least one movable member while a second portion remains engaged with the tensioning device.

10. The method of claim 9, further comprising the step of severing the first portion of the subsea tubular from the second portion for processing while the second portion remains engaged with the tensioning device for further retrieval of the subsea tubular.

11. The method of claim 10, wherein the step of severing the first portion of the subsea tubular from the second portion comprises continuously moving the subsea tubular using the tensioning device and moving a cutting device at a rate and direction equal to that of the subsea tubular.

12. The method of claim 1, further comprising the steps of:
partially excavating the subsea tubular such that a second region is exposed; and
severing the subsea tubular within the second region to create a second end.

13. A method for retrieving and processing a segment of a subsea tubular, the method comprising the steps of:
partially excavating the subsea tubular such that a region is exposed;
severing the subsea tubular within the region to create an end;
engaging the end of the subsea tubular with a tensioning device positioned on a vessel, wherein the tensioning device comprises at least one movable member adapted to contact an exterior surface of the subsea tubular;
moving said at least one movable member to apply an axial force to the subsea tubular, wherein moving said at least one movable member unearths the subsea tubular from beneath a sea floor and pulls the subsea tubular toward the tensioning device, thereby moving a first portion of the subsea tubular beyond the at least one moveable member while a second portion remains engaged with the tensioning device; and
severing the first portion of the subsea tubular from the second portion for processing by continuously moving the subsea tubular using the tensioning device and moving a cutting device at a rate and direction equal to that of the subsea tubular, while the second portion remains engaged with the tensioning device for further retrieval of the subsea tubular.

14. The method of claim 13, further comprising the step of moving the vessel in a direction concurrent with that of the axial force applied to the subsea tubular by the tensioning device to apply a combined force to the subsea tubular.

15. The method of claim 13, further comprising the step of moving the vessel in a direction that differs from that of the axial force applied to the subsea tubular by the tensioning device to compensate for motion imparted to the vessel by the subsea tubular, an ambient environmental condition, or combinations thereof.

16. A system for retrieval and continuous processing of a subsea tubular beneath a seafloor, the system comprising:
an excavated region of the subsea tubular, wherein the subsea tubular is severed within the excavated region to create an end of the subsea tubular;
a tensioning device positioned on a vessel, wherein the tensioning device comprises at least one movable member adapted to contact the end of the subsea tubular, wherein movement of said at least one movable member applies an axial force to the subsea tubular; and
a cutting device positioned in association with the tensioning device, wherein the cutting device is adapted to sever a first portion of the subsea tubular extending beyond the at least one movable member, wherein the cutting device is movable along an axis parallel to that of the subsea tubular to enable simultaneous movement of the subsea tubular and the cutting device for facilitating the severing of the first portion, and wherein a second portion of the subsea tubular remains engaged with the tensioning device for continuous application of the axial force thereto.

17. The system of claim 16, wherein the cutting device comprises a guillotine cutter movable along a track.

18. The system of claim 16, further comprising a hoisting device for moving the first portion from the vessel to an adjacent vessel or facility or a storage area of the vessel.

19. The system of claim 16, further comprising a dynamic positioning system adapted to move the vessel to accommodate for forces imparted to the vessel by the subsea tubular, an ambient environmental condition, or combinations thereof.

* * * * *